(12) United States Patent
Cull et al.

(10) Patent No.: US 8,919,618 B2
(45) Date of Patent: Dec. 30, 2014

(54) OVER PRESSURE RELEASE VALVE

(75) Inventors: David Cull, Bangkok (TH); Mark Sillince, West Sussex (GB)

(73) Assignee: Joseph Company International, Inc., Irvine, CA (US)

( * ) Notice: Subject to any disclaimer, the term of this patent is extended or adjusted under 35 U.S.C. 154(b) by 68 days.

(21) Appl. No.: 13/695,281

(22) PCT Filed: May 5, 2011

(86) PCT No.: PCT/US2011/035386
§ 371 (c)(1),
(2), (4) Date: Feb. 14, 2013

(87) PCT Pub. No.: WO2011/140361
PCT Pub. Date: Nov. 10, 2011

(65) Prior Publication Data
US 2013/0133761 A1    May 30, 2013

Related U.S. Application Data

(60) Provisional application No. 61/331,556, filed on May 5, 2010.

(51) Int. Cl.
| B65D 83/00 | (2006.01) |
| B67D 7/80 | (2010.01) |
| F16K 17/02 | (2006.01) |
| B65D 83/70 | (2006.01) |

(52) U.S. Cl.
CPC ............... *F16K 17/02* (2013.01); *B65D 83/70* (2013.01)
USPC ............... 222/396; 222/146.3; 222/146.6; 222/402.1

(58) Field of Classification Search
USPC .............. 222/396, 397, 402.16, 402.1, 146.1, 222/146.3, 146.6; 137/599.16, 599.18
See application file for complete search history.

(56) References Cited

U.S. PATENT DOCUMENTS

| 3,005,577 A * | 10/1961 | Webster ........................ 222/397 |
| 3,081,919 A * | 3/1963 | Samuel ......................... 222/396 |
| 3,666,148 A * | 5/1972 | Webster ........................ 222/396 |
| 3,838,799 A * | 10/1974 | Meuresch et al. ....... 222/402.16 |
| 3,870,203 A * | 3/1975 | Frankenberg ................. 222/397 |
| 5,348,199 A * | 9/1994 | Smith ........................ 222/402.19 |
| 6,338,339 B1 * | 1/2002 | Tsutsui et al. ........... 128/200.23 |

OTHER PUBLICATIONS

International Search Report, PCT/US2011/035386, mailed Aug. 3, 2011.

* cited by examiner

*Primary Examiner* — J. Casimer Jacyna
*Assistant Examiner* — Benjamin R Shaw
(74) *Attorney, Agent, or Firm* — Novak Druce Connolly Bove + Quigg LLP

(57) ABSTRACT

A self chilling beverage container including a heat exchange unit having a pressurized medium therein secured internally thereof and including an over-pressure relief valve. The valve includes a hollow housing within which there is first and second valves. The first valve is operable to inject and release the pressurized medium into the container. The second valve is normally closed and is continuously exposed to the pressurized medium and in response to the pressure thereof reaching a predetermined level opens to exhaust the pressurized medium to the atmosphere to relieve the excess pressure.

7 Claims, 7 Drawing Sheets

OVER PRESSURE RELEASE VALVE

BACKGROUND OF THE INVENTION

1. Field of the Invention

This invention relates generally to containers housing a pressurized medium and includes self-chilling or self-heating food and beverage containers, aerosol containers or the like. More specifically, this invention is directed to a valve incorporated into such containers which will automatically relieve pressure built up in the container upon such pressure reaching a predetermined level and at the same time can function to provide the normal desired operation of the container.

2. Description of Prior Art

The prior art directed to aerosol valves and to self-chilling and self-heating food and beverage containers is quite extensive. A major problem with regard to containers particularly in these arts which house a pressurized medium utilized in dispensing the contents of the container or to heat or chill the contents of the container is that the pressure of the medium can, under certain circumstances, reach a level, if not controlled, which will cause a container to rupture and possibly even explode thereby imparting injury to users. Various attempts have been made with such prior art containers to relieve the pressure prior to serious rupture of the container or the explosion of the container. One over pressure relief mechanism used particularly in aerosol cans, includes having the necked in portion of the can stretch to increase the volume. This will cause the valve cup which carries the dispensing valve to also move. If the over pressurized condition within the container increases sufficiently, it causes the valve cup to move by an amount sufficient that causes the periphery thereof to release from the edge of the container thereby allowing the over pressure condition to be relieved and in some instances the valve will fly off from the container and can potentially injure someone.

Another feature which has been embodied in such containers is to coin a portion of the bottom of the container to weaken a section thereof in such a manner that when the pressure internally of the container reaches a predetermined level, the material forming the container around the coined area releases and the contents of the pressurized medium exit the container, thereby relieving the over pressure condition.

feature which has been utilized under certain circumstances is to permit the concave bottom of the can to expand outwardly thus increasing the volume in the can.

An additional over pressure mechanism which has been embodied in containers, particularly those directed to self-chilling or self-heating food and beverage containers is illustrated in U.S. Pat. No. 6,732,886 which is incorporated herein. This patent discloses an over pressure release mechanism which includes a valve member having a valve stem for releasing the pressurized medium upon activation. The valve member is carried by a pedestal which is moveable relative to the container upon pressure in the container reaching a predetermined level. A barrier is disposed adjacent the valve stem and is anchored to the container. When the pedestal moves by a predetermined amount responsive to pressure reaching the predetermined level, the valve stem engages the barrier activating the valve which relieves the over pressure condition. This apparatus has been proven to be effective for the purpose intended.

The over pressure mechanism, as shown in U.S. Pat. No. 6,732,886 is illustrated in FIG. 1. As therein shown a container 12 housing a beverage 14 has a top 16 formed in the usual manner and could include a lift tab (not shown) as is well known in the prior art. A heat exchange unit 20 having a valve 18 secured to a pedestal 22 is secured to the top portion 24 of the HEU 20 by crimping as is well known in the prior art. The valve 18 includes a valve stem 26. Upon activation of the valve stem 26, a pressurized gas such as carbon dioxide may be directed internally of the HEU 20 through an orifice 28 in the valve to be adsorbed by a carbon plug 38 comprised of compressed activated charcoal or the like and may include a binder and other materials. A cap 30 is disposed over the valve stem 26 to protect it from inadvertent activation. Internally of the cap 30 there is provided a barrier 32 disposed adjacent the top of the valve stem 26. When the pressure internally of the HEU 20 increases beyond a predetermined amount, the pedestal 22 moves toward the bottom of the container 12, and as such occurs, the valve stem 26 contacts the barrier 32 and causes the stem to become activated thereby releasing the pressure built up internally of the HEU.

Even though this apparatus as shown in FIG. 1 functions very well for the purpose intended, a need exists for an over pressure mechanism housed internally of the valve and constructed in such a manner that the valve will normally operate but at the same time will be activated by an over pressure condition to release the over pressure internally of the HEU without causing the pedestal of the HEU to expand or move as has been the case in the prior art.

SUMMARY OF THE INVENTION

The present invention includes a self chilling beverage container having a heat exchange unit housing a pressurized medium secured internally thereof to be in contact with a beverage in the container. The heat exchange unit includes a valve mechanism having a hollow valve housing with a hollow valve stem slidably disposed within said body and having an actuating rod exiting a first end of the housing and protruding from the valve. A housing base closing the opposite end of the hollow valve housing. A pressure relief sealing plug disposed within the hollow valve stem. Means for continuously urging said sealing plug downwardly against a valve stem base to form a seal there between to provide a normally closed valve, the sealing plug being exposed to the interior of the container to continuously receive the pressure of the medium contained therein. Upon the pressure within the container reaching a predetermined level, the sealing plug moves upwardly against the means urging it downwardly thereby breaking the seal established between the sealing plug and the stem base and allowing the pressure contained in the container to be relieved by exiting the valve stem. Spring means disposed within said valve housing between said housing base and said valve stem, a valve seal, said spring means urging said valve stem into engagement with said seal, said valve stem being movable between a closed and open position to inject the pressurized medium into the container and to release the pressurized medium from the container.

DETAILED DESCRIPTION OF THE DRAWINGS

Figure 2:
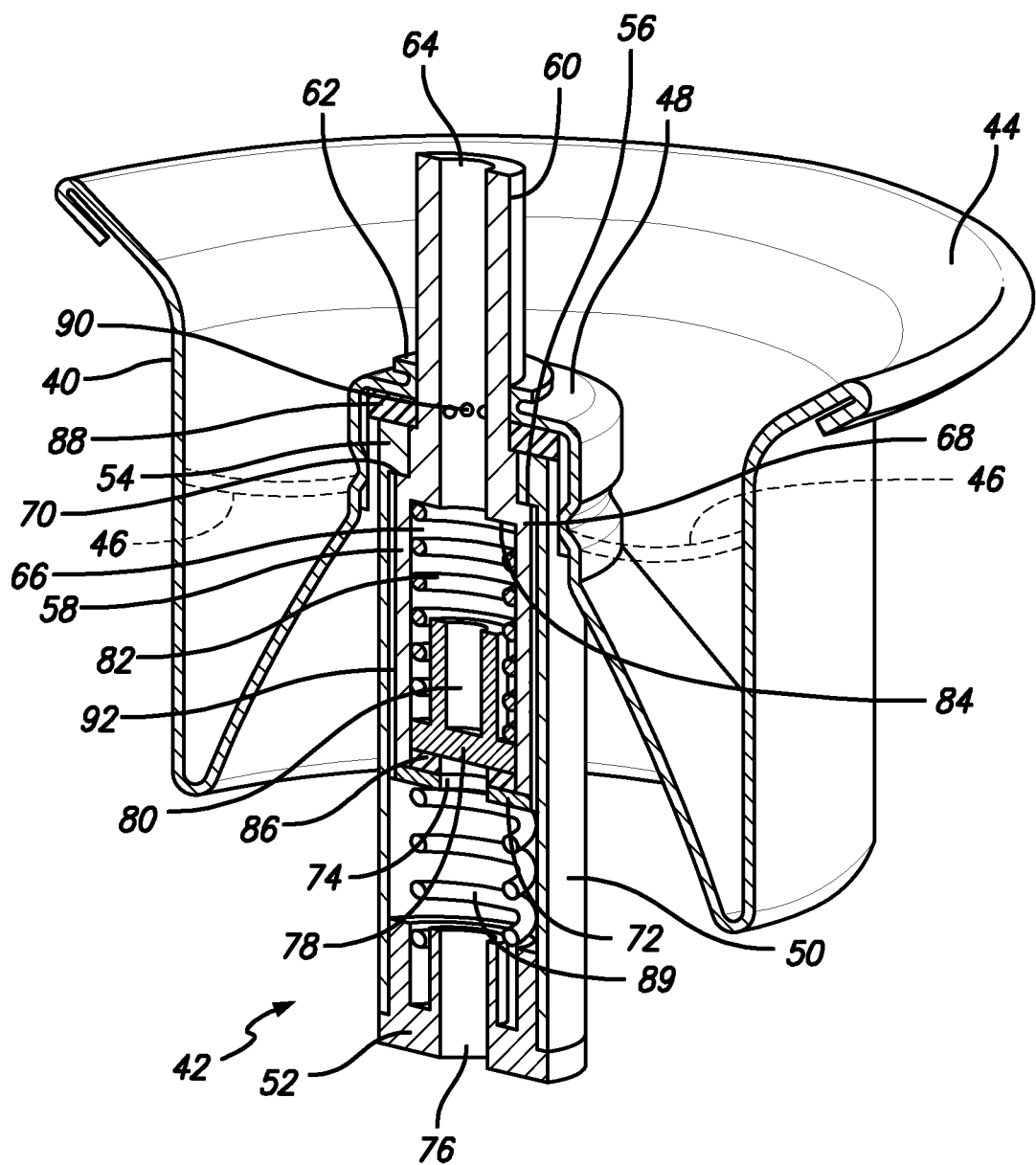
FIG. 2 is a perspective view illustrating the valve design of the present invention in cross-section.
Figure 3:
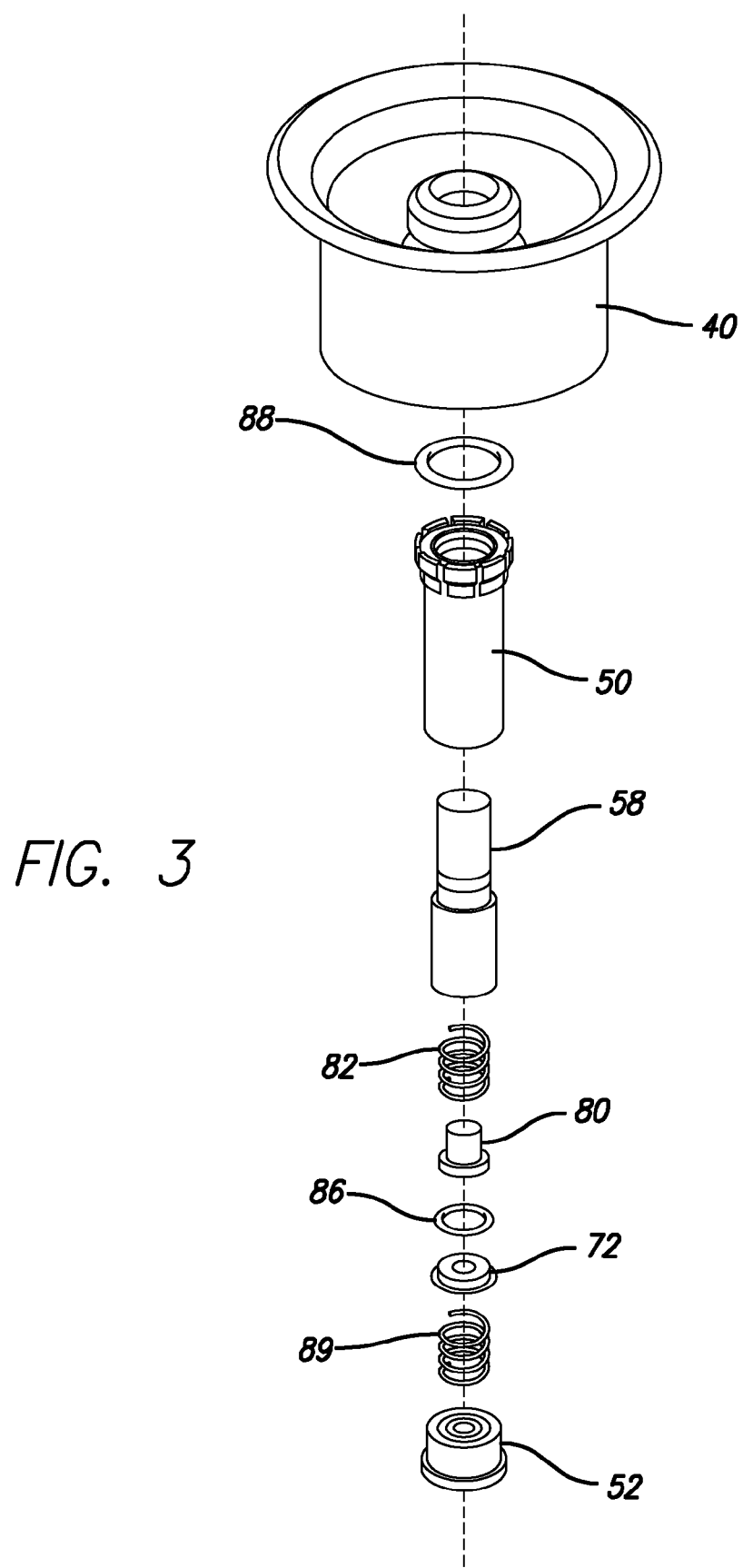
FIG. 3 is an exploded view in perspective showing the various parts of the valve as shown in FIG. 2.

Referring now to the drawings and more particularly to FIGS. 2 and 3, there is illustrated in perspective view the valve design of the present invention including various parts thereof in an exploded view as shown in FIG. 3.

The valve design of the present invention includes two distinct operable valves housed within a single valve housing or body. The first of these two valves is operable to allow a medium under pressure to be injected into the container and then to release the medium into the atmosphere for the purpose intended by the particular container. The medium may be any and all vaper phase of both liquid and gaseous propellants. As one example, carbon dioxide gas under pressure may be injected into a heat exchange unit having a plug of compressed activated carbon therein which adsorbs the carbon dioxide. At a later time, the valve may be activated to release the carbon dioxide into the atmosphere for cooling a food or beverage surrounding the heat exchange unit. The second of these two valves is continuously exposed to the medium under pressure, such as the carbon dioxide. If the medium under pressure exceeds a predetermined pressure, this valve is caused to move away from a seal by the excess pressure to allow the excess pressure to dissipate.

As is shown, the valve design of the present invention includes a valve cup 40 within which is disposed the valve 42. Valve cup 40 may be a deep draw cup as illustrated or alternatively, be a standard valve cup as is shown in the prior art in FIG. 1 in which the deep draw would be eliminated and the valve cup extended outwardly to the flange 44 as shown by the additional dashed lines 46. The valve 42 is affixed to the pedestal 48 of the valve cup 40.

The valve 42 includes a hollow valve housing or body 50 which is closed at its lower end by a body base 52 and at its upper end includes an inwardly directed flange 54 which defines a stop 56. A hollow valve stem 58 is disposed internally of the valve housing or body 50 and includes an actuator rod 60 which extends upwardly through the top of the valve body 50 and through an opening 62 in the pedestal 48. The actuator rod 60 defines an elongated opening 64 therethrough which communicates with the hollow interior portion 66 of the valve stem 58. The valve stem 58 includes an enlarged upper area 68 which defines a shoulder 70 that engages the stop 56 on the valve body 50. The lower portion of the valve stem 58 is closed by a stem base 72 which defines an opening 74 therein which provides communication through an opening 76 in the body base to the interior of the container or heat exchange unit. It will be recognized by those skilled in the art that the pressure from the pressurized medium internally of the container or heat exchange unit is continuously applied through the openings 76 and 74 to the lower surface 78 of a pressure relief sealing plug 80 that is disposed internally of the hollow enlarged portion 68 of the valve stem 58. A pressure relief spring 82 is seated around the pressure relief sealing plug 80 and abuts the upper portion 84 of the enlarged section 68 of the valve stem 58. The pressure relief spring continuously urges the pressure relief sealing plug downwardly as viewed in FIG. 2 into engagement with a pressure relief seal 86 which precludes the pressure in the pressurized medium internally of the container or HEU from exiting the container or HEU during normal operation of the valve.

The upper portion 54 of the valve housing or body 50 engages a normal valve seal 88 such as a typical gasket or the like. The valve seal 88 closes a plurality of openings 90 defined by the actuating rod 60.

Figure 1:
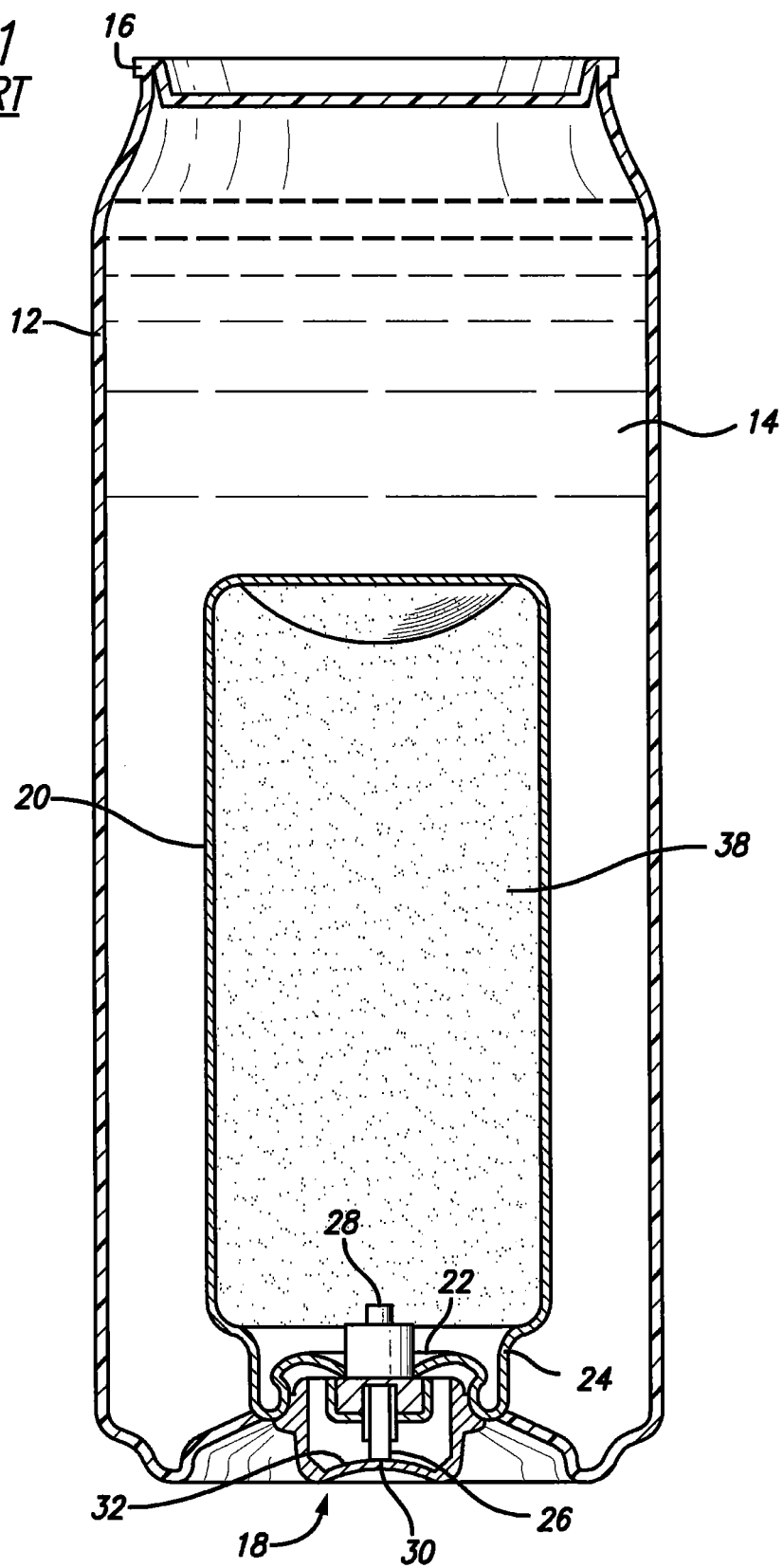
FIG. 1 illustrates the prior art.
Figure 8:
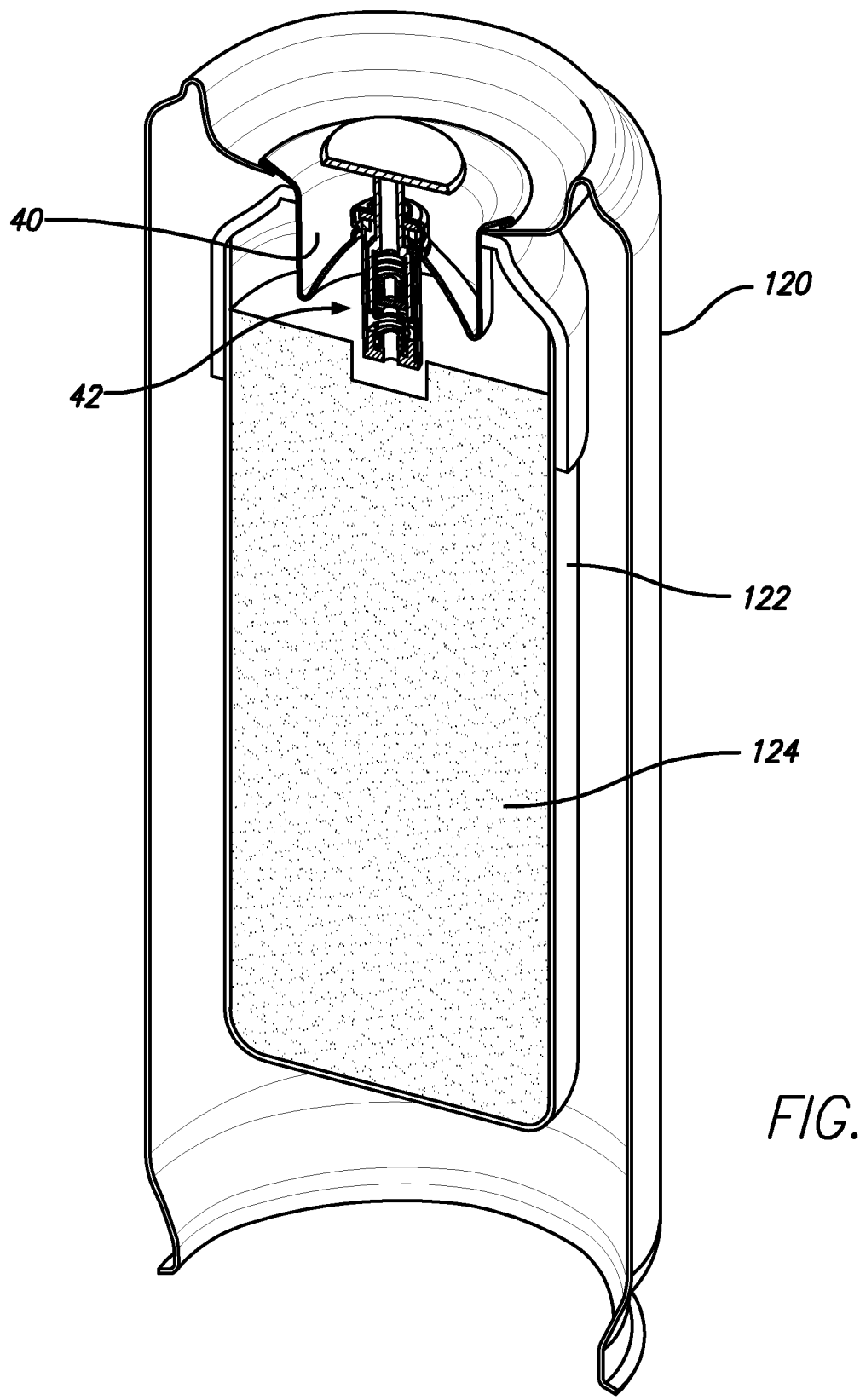
FIG. 8 is a perspective view in cross section showing the valve assembled in a HEU secured to a beverage container.

A normal operation spring 89 is retained between the body base 52 and the stem base 72 and urges the valve stem 58 upwardly as viewed in FIG. 2 so that the shoulder 70 on the valve stem engages the stop 56 on the valve body 50. In this position, the normal valve seal 88 closes a plurality of openings 90 formed in the actuator rod 60. It will be recognized by those skilled in the art that the valve as shown in FIG. 2 will be secured to the container or HEU by the flange 44 being crimped to the top of the HEU such as is illustrated in FIGS. 1 and 8.

During normal operation when it is desired to inject the pressurized medium internally of the container or HEU such that it is adsorbed by the compressed carbon particles contained therein, the valve stem 58 is pressed downwardly as viewed in FIG. 2. This downward movement displaces the shoulder 70 from the stop 56 and moves the plurality of openings 90 away from the seal 88 to provide communication between the opening 64 in the valve stem 58 and the clearance or passageway 92 between the outer surface of the valve stem 58 and the inner surface of the valve housing 50. The pressurized medium such as carbon dioxide is injected through the elongated opening 64 and it is allowed to pass through openings such as shown at 90 in the actuator rod of the valve stem 58 and to pass through the clearance or passageway 92 and flow downwardly and through the opening 76 into the interior of the HEU. The carbon dioxide gas under pressure is then adsorbed by the carbon particles contained within the HEU as shown at 124 in FIG. 8. When the desired amount of carbon dioxide is adsorbed, the valve stem 58 is allowed to return to the position as shown in FIG. 2 at which time the openings 90 are sealed by the normal valve seal 88 thus precluding the carbon dioxide gas under pressure from being exhausted from the HEU.

Figure 4:
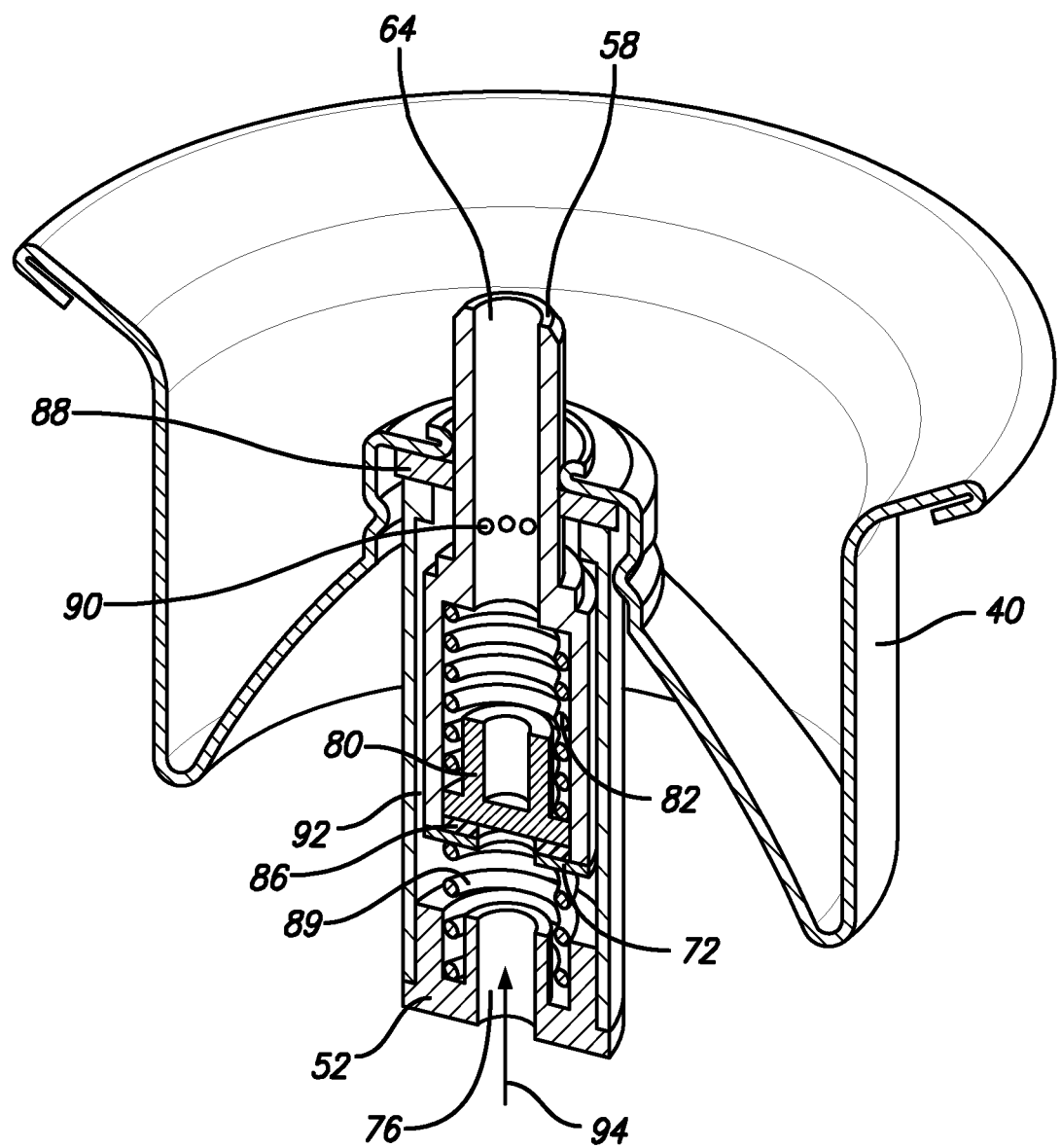
FIG. 4 is a perspective view in cross-section illustrating the normal operation of the valve as illustrated in FIG. 2.

As is shown in FIG. 4, when it is desired to activate the HEU to cool the contents of the container which surround the HEU, it is necessary for the pressured medium which has been adsorbed by the carbon particles contained within the HEU to escape from the HEU and in that process to draw the heat from the material such as a beverage surrounding the HEU causing it to become cooled. This operation occurs by depressing the valve stem 58 downwardly against the force of the spring 89 as shown in FIG. 4. When this occurs, the plurality of openings 90 move downwardly away from the normal valve seal 88. When such occurs, the pressurized medium contained within the HEU passes through the opening 76 in the body base 52 as shown by the arrow 94 and would then flow upwardly through the passageway 92 between the exterior of the valve stem and the interior of the valve body and exit through the plurality of openings 90 into the elongated opening 64 and outwardly into the atmosphere through the elongated opening 64 in the valve stem 58. As long as the valve stem is maintained in this depressed condition as shown in FIG. 4, the pressurized medium is allowed to exit the HEU and to thereby remove the heat from the beverage or food surrounding the HEU. The structure of the valve may be such that when thus depressed, it is locked in the depressed position thus allowing the pressurized medium to escape as shown at 94 until it has all been dissipated. Alternatively, the structure may be such that the valve stem can be depressed and then released to return to the sealed position thus stopping the exit of the pressurized medium allowing the valve stem to again later be depressed if such is desired. This opening and closing operation would be used when an aerosol propellant ejects contents of the container as is well known in the art. It will be noted that the pressure relief sealing plug 80 or pressure relief spring 82 is not depressed or activated in any manner during the normal operation of the valve as shown in FIG. 4. That is, the pressure relief valve system remains static relative to the valve stem 58 and travels with the valve stem 58 during this operation. It is only the spring 89 which is compressed by the downward movement of the valve stem 58 to thus allow the pressurized medium to exit the HEU.

Figure 5:
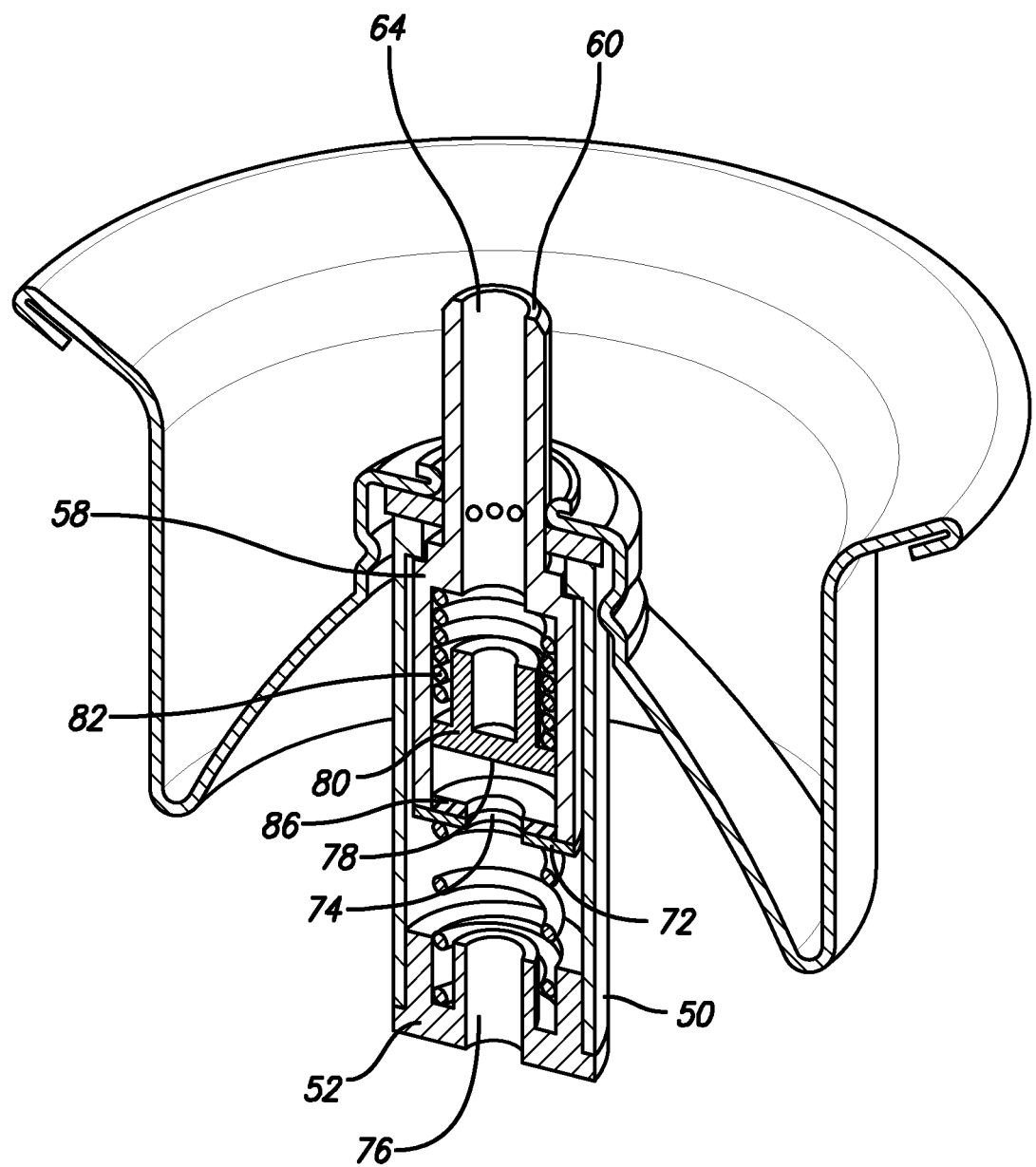
FIG. 5 is a perspective view in cross-section showing the pressure relief operation of the valve.

Referring now to FIG. 5, the pressure relief operation of the valve is illustrated. It will be recognized by those skilled in the art that the lower surface 78 of the sealing plug 80 is continuously exposed to the pressure of the pressurized medium. During the pressure relief operation, the pressure from the pressurized medium enters the valve body through the opening 76 in the body base 52. This pressurized medium also passes through the opening 74 in the stem base 72. When the pressure of the pressurized medium exceeds a predetermined amount, which is determined by the spring rate of the pressure relief spring 82, the pressure relief sealing plug 80 moves upwardly against the force or bias of the spring 82 as is illustrated in FIG. 5. When such occurs, the pressure relief plug is moved away from the pressure relief seal 86, thus allowing the pressurized medium to pass through the opening 74 and around the outer edge of the pressure relief plug and pass through the elongated opening 64 in the valve stem 58 and exit to the atmosphere. The outer most edge of the pressure relief plug is dimensional to provide a clearance between it and the inner surface of the hollow valve stem to provide the flow path for the pressurized medium. When such occurs, the overpressure which is within the HEU is allowed to become dissipated. When the pressure drops below the predetermined amount, the pressure relief spring 82 then returns the pressure relief plug 80 into engagement with the seal 86 which again seals the HEU and precludes further exhausting of the pressurized medium from the HEU to the atmosphere. The relief plug 80 will remain in the sealed position unless the pressure again builds up and exceeds the predetermined pressure. The valve stem 58 remains static relative to the valve housing 50 during the operation of the pressure relief valve.

It will be recognized by those skilled in the art that the dual valve system of the present invention provides the distinct flow paths for the pressurized medium contained within the HEU. The first of these is the elongated opening 64, the plurality of openings 90, the passageway 92 and the opening 76 with the pressurized medium flowing downwardly to be adsorbed or upwardly to be desorbed. The second of those is upwardly through the opening 76, the opening 74, around the pressure relief sealing plug, through the hollow housing 50 and out through the elongated opening 64.

Figure 6:
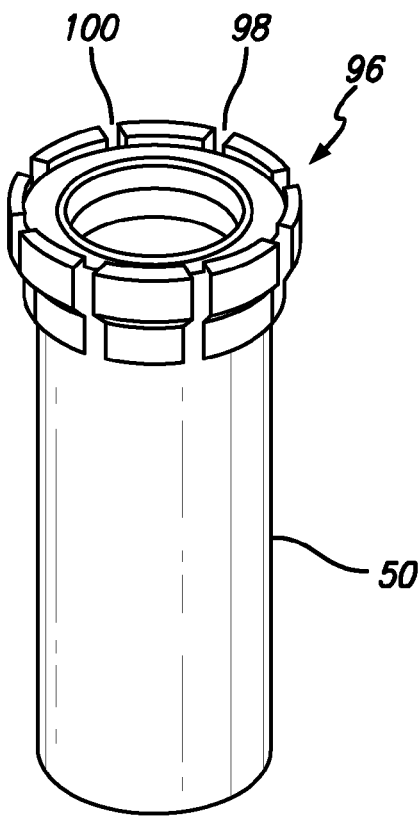
FIG. 6 is a view in perspective illustrating in greater detail the valve body.

Referring now to FIG. 6, an alternative design of the valve body 50 is illustrated. As is seen in FIG. 6, the upper portion 96 of the valve body is castellated as shown at 98 and 100. This castellation aids to improve speed of the gas flow, the pressurized medium to be injected into the container or the HEU when filling the container. The pressurized medium passes around the valve stem, over the seal 88, through the castellations and into the container or HEU.

Figure 7:
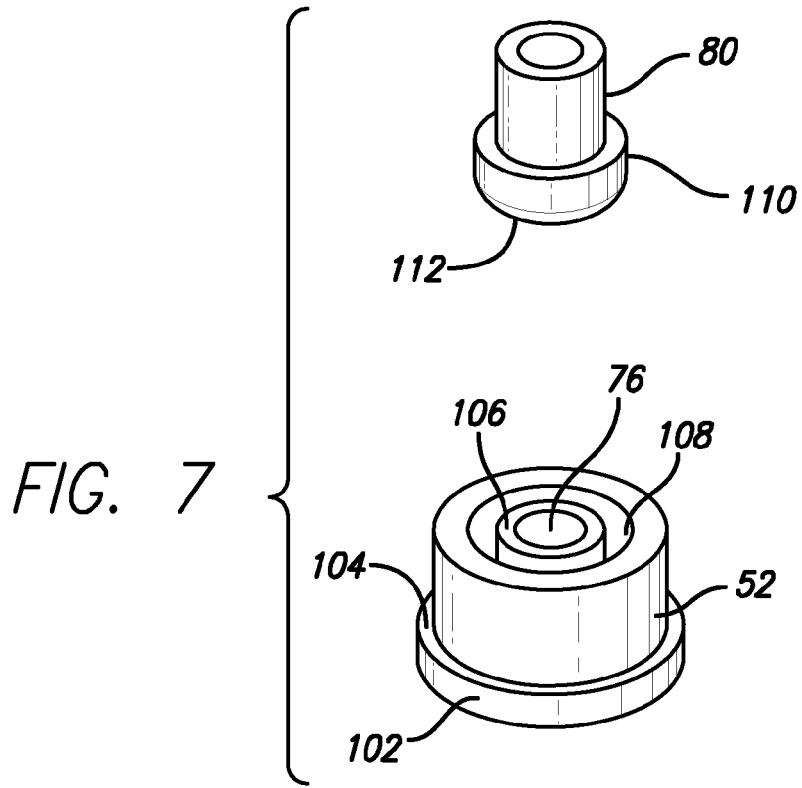
FIG. 7 is a Figure similar to FIG. 6 but illustrating in greater detail the body base and the pressure relief plug.

Referring now to FIG. 7, the body base 52 and the sealing plug 80 are illustrated in further detail. As is therein shown, the body base includes an outwardly extending flange 102 which defines a shoulder 104 which engages the bottom of the hollow valve body 50. The opening 76 through the base 52 is defined by an upwardly directed tubular member 106 which with base 52 defines a groove 108. The normal operational spring 89 is seated within the groove 108 and is trapped between the body base 52 and the stem base 72. The body base 52 defines a shoulder 104 which engages the bottom of the hollow valve body 50.

The pressure relief sealing plug 80 includes an outwardly directed flange 110 and defines a lower surface 112 against which the pressurized medium is applied at all times. As above indicated and as will be recognized by those skilled in the art, during normal operation of the container having the pressurized medium internally of the HEU, the pressure relief plug 80 will remain sealed against the pressure relief seal 86 and the spring 82 will maintain the plug sealed at all times. It is only when the pressure of the pressurized medium contained with the HEU exceeds a predetermined level that the pressure relief sealing plug moves to allow dissipation of the excess pressure.

Referring now to FIG. 8, there is illustrated a container 120 within which there is disposed a heat exchange unit (HEU) 122. The HEU is retained in place by crimping a flange of the valve cup 40 about the periphery of the opening in the HEU. The valve 42 is secured in the valve cup 40 as above described. A plug 124 of compressed carbon particles is retained within the HEU 122 to adsorb and desorb the pressurized carbon dioxide as above described. The opening in the bottom (as viewed in FIG. 8) of the container is closed by a member (not shown) which includes a pull tab similar to that shown and described in FIG. 1 and a beverage is typically contained within the container 120 and surround the HEU 122.

There has been disclosed an over pressure release valve housed within a container for a pressurized medium will normally operate to inject the medium into the container and release it from the container for the desired application but at the same time will be automatically activated when the pressure of the medium exceeds a predetermined level to relieve the excess pressure without damage to the container.

What is claimed is:

1. A self chilling beverage container including a heat exchange unit therein having an over pressure relief valve therein comprising:
   (A) a container for receiving a beverage and having a bottom defining an opening therethrough;
   (B) a heat exchange unit having compacted carbon therein for adsorbing pressurized carbon dioxide gas;
   (C) a valve cup secured to said heat exchange unit and to said opening in the bottom of said container to dispose said heat exchange unit in contact with the beverage;
   (D) a valve mechanism secured to said valve cup and extending into said heat exchange unit, said valve mechanism including
      (1) a hollow valve having a hollow cylindrical housing having an inner wall, a top surface defining a plurality of castellations, and a lower open end;
      (2) a separate housing base closing said lower open end of said housing and defining an opening therethrough and including an outwardly extending flange which defines a shoulder, the lower end of said housing engaging said shoulder, said housing base further defines a groove surrounding said opening therethrough;
      (3) a first valve having a hollow valve stem disposed within said hollow cylindrical housing and having an outer wall and an actuator rod defining a plurality of transverse openings therein and an elongated opening communicating directly with the atmosphere through which said pressurized carbon dioxide gas flows and a valve stem base defining an orifice therethrough;
      (4) a first spring disposed within said hollow valve stem;

(5) a pressure relief sealing plug seated over the orifice in said valve stem base;

(6) said first spring being seated between said pressure relief sealing plug and a surface of said hollow interior of said valve stem biasing said pressure relief sealing plug toward said orifice in said valve stem base to close said orifice in said valve stem base;

(7) said orifice in said valve stem base being continuously exposed to said pressurized carbon dioxide gas in said heat exchange unit; and (8) a second spring in series with said first spring seated within said groove in said cylindrical housing base and engaging said valve stem base urging said first valve upwardly to close said first valve.

2. A self chilling beverage container as defined in claim 1 wherein a first passageway for flow of the pressurized carbon dioxide gas is defined between an inner wall of said hollow housing and an outer wall of said hollow valve stem, said passageway communicating with the opening in said housing base, said first passageway being opened by moving said valve stem against the bias of said second spring toward an open position, said pressure relief plug remaining static relative to said valve stem.

3. A self chilling beverage container as defined in claim 2 wherein a second passageway for flow of the pressurized carbon dioxide gas is defined by said pressure relief sealing plug moving away from said orifice in said valve stem base responsive to the pressure of said pressurized medium exceeding a predetermined level, said valve stem remaining static relative to said housing.

4. A self chilling beverage container as defined in claim 3 wherein clearance is defined between said sealing plug and an inner surface of said hollow valve stem to provide the second passageway.

5. A self chilling beverage container as defined in claim 4 wherein the pressurized carbon dioxide gas flows through said castellations into the interior of said container when said pressurized carbon dioxide gas is injected into said container.

6. A self chilling beverage container as defined in claim 2 wherein said plurality of openings in said actuator rod are interconnecting said first passageway with said elongated opening.

7. A self chilling beverage container as defined in claim 6 which further include a seal surrounding said actuator to close the plurality of openings in said actuator rod when said valve stem is in its closed position.

\* \* \* \* \*